United States Patent [19]
Arnold, Jr. et al.

[11] Patent Number: 5,269,972
[45] Date of Patent: Dec. 14, 1993

[54] DOPED ZINC OXIDE MICROSPHERES

[75] Inventors: Wesley D. Arnold, Jr., Oak Ridge; Walter D. Bond, Knoxville; Robert J. Lauf, Oak Ridge, all of Tenn.

[73] Assignee: Cooper Industries, Inc., Houston, Tex.

[21] Appl. No.: 744,274

[22] Filed: Aug. 13, 1991

Related U.S. Application Data

[62] Division of Ser. No. 575,178, Aug. 29, 1990, Pat. No. 5,062,993.

[51] Int. Cl.$^5$ .............................................. H01B 3/10
[52] U.S. Cl. ...................................... 252/519; 252/518; 252/315.01; 423/593; 423/622; 428/402
[58] Field of Search .................... 252/518, 519, 315.01; 423/622, 593; 264/61, 66; 428/402

[56] References Cited

U.S. PATENT DOCUMENTS

| | | | |
|---|---|---|---|
| 4,219,518 | 8/1980 | Philipp | 252/518 |
| 4,297,250 | 10/1981 | Gupta et al. | 252/518 |
| 4,510,112 | 4/1985 | Lauf | 264/234 |
| 4,681,717 | 7/1987 | Brooks et al. | 252/518 |
| 4,758,469 | 7/1988 | Lange | 428/325 |
| 4,811,164 | 3/1989 | Ling et al. | 252/518 |
| 5,039,452 | 8/1991 | Thompson et al. | 252/518 |
| 5,062,993 | 11/1991 | Arnold, Jr. et al. | 252/518 |

OTHER PUBLICATIONS

Lauf et al., "Fabrication of High Field Zinc Oxide Varistors by Sol-Gel Processing", *Ceramic Bulletin* vol. 63, No. 2, pp. 278–281, 1984.

*Primary Examiner*—Paul Lieberman
*Assistant Examiner*—Bradley A. Swope
*Attorney, Agent, or Firm*—Laff, Whitesel, Conte & Saret

[57] ABSTRACT

A new composition and method of making same for a doped zinc oxide microsphere and articles made therefrom for use in an electrical surge arrestor which has increased solid content, uniform grain size and is in the form of a gel.

10 Claims, 2 Drawing Sheets

FIG. I

DOPED ZINC OXIDE MICROSPHERES

The U.S. Government has a paid up license in this invention and the right in limited circumstances to require the patent owner to license others on reasonable terms as provided by the terms of contract No. DE-AC05-84OR21400 awarded by the Department of Energy.

This application is a division, of prior application Ser. No. 07/575,178 filed Aug. 29, 1990 now U.S. Pat. No. 5,062,993.

FIELD OF THE INVENTION

This invention relates to a novel doped zinc oxide microsphere composition and method of preparing same. More particularly, the present invention relates to doped zinc oxide microspheres having an increased solid content and the method of preparing same in the form of a gel.

BACKGROUND OF THE INVENTION

The development of new and improved compounds for use as varistors in electrical surge arrestors is a continuing concern in view of the ever increasing demand for electricity and electrically powered devices. Varistors are electrical resistors that do not obey Ohm's law in that the current flowing through a varistor is not proportional to the applied potential voltage. Because of the varistor's non-ohmic behavior, when a line voltage exceeds the breakdown voltage, the surge is carried away through the varistor and the circuit is thereby protected.

Presently, there exist certain compounds made from oxide powders that may optimally be used as varistors. The oxide varistors, in turn, are suitable for use as surge arrestors or voltage limiters in electrical devices due to their non-ohmic behavior. Nonohmic behavior is achieved by doping zinc oxide with one or more oxides which results in the formation of voltage barriers at the grain boundaries. The increase in the varistor conductivity is related to temporary breakdown of the grain boundary barriers. Thus, the varistor breakdown voltage ($V_b$) is inversely related to the average zinc oxide grain size.

Aside from zinc oxide varistors, there are a variety of other known varistors, including silicon carbide, carbon and selenium varistors. However, zinc oxide varistors, which are ceramics that have highly nonlinear electrical conduction characteristics, have several other advantages over the other above-mentioned varistors which are spark gap devices. Accordingly, zinc oxide varistors are especially suitable for use as surge arrestors or voltage limiters in electrical systems.

However, despite the suitability of zinc oxide varistors in surge arrestors and the like, it is known that the electrical properties and reliability of zinc oxide varistors depend critically on internal homogeneity, i.e., chemical and microstructural. This desired homogeneity is often disrupted by the techniques employed in the preparation of the varistors. For example, the creation of highly sinterable powders and required mixing of dopants into the zinc oxide involves a ball milling technique. However, this required milling technique introduces contaminants into the varistor from the milling medium. Likewise, the fine, highly sinterable powders made by various chemical techniques, such as conventional sol-gel processes, are often difficult to handle and are incapable of filling large dies uniformly prior to the pressing and sintering process.

Known chemical processes for the production of zinc oxide varistors generally involve the use of a hydrous oxide powder which is fabricated by either conventional precipitation techniques or sol-gel techniques. While the sol-gel technique has been demonstrated to be superior to other methods of zinc oxide varistor production, there still are problems associated with its use. Moreover, additional problems are caused by the powders that are used in these techniques in the fabrication of zinc oxide varistors. For example, clumping and agglomeration problems may occur in finely divided zinc oxide powders that are used in small varistor devices When such clumping of the powder occurs, it becomes difficult to obtain the desired sintered density and grain size in the final product when fabricating a large surge arrestor. Because uniform grain size is an essential requirement for the ceramic varistor to properly function as a reliable surge arrestor, it is a problem that cannot be ignored. Moreover, these above-mentioned techniques are sensitive to pressure and calcining temperature and cannot tolerate normal day to day variations in conditions which exist in actual manufacturing.

U.S. Pat. No. 4,510,112 discloses a process for producing zinc oxide based varistors that comprises particles of zinc oxide and metal-oxide dopants. Although the process disclosed in the '112 patent promotes densification while restricting liquid formation and grain growth, the problems associated with powder clumping and agglomeration are still present and accordingly, precludes uniform grain size.

Problems similar to those disclosed in the above-mentioned '112 patent result from the sol-gel technique used in the article "Fabrication of High-Field Zinc Oxide Varistors by Sol-Gel Processing", R. J. Lauf and W. D. Bond, *Ceramic Bulletin*, Vol. 63, No. 2, pp. 278-281 (1984). The powders used in the above-cited article are processed at low temperatures, i.e. 1000° C., to minimize liquid formation during sintering. While the above-mentioned liquid formation was minimized and grain growth was slightly reduced, the resulting preparation still has apparent instability.

Thus, attempts have been made in the field to develop a process for fabricating zinc oxide varistors which have uniform grain size and which can be sintered to full density an which may be used in surge arrestors. Hence, the preparation of the oxide powder in the form of gel microspheres and the modified sol-gel process for fabricating same, both of which are developed by this invention are utilized in electrical surge arrestors.

SUMMARY OF THE INVENTION

Accordingly, it is an object of the present invention to provide improved zinc oxide materials for use in surge arrestors.

Another object of the present invention is to provide improved zinc oxide materials in the form of homogeneous microspheres.

Another object of the present invention is to provide improved zinc oxide materials which have uniform grain sizes.

Another object of the present invention is to provide improved zinc oxide materials which have an increased solids content.

Another object of the present invention is to provide zinc oxide materials which can be sintered to full density and independently function as a mini-varistor for use in surge arrestors.

Another object of the present invention is to provide zinc oxide materials which can be sintered to full density without hot pressing and independently function as a mini-varistor for use in surge arrestors.

Another object of the present invention is to provide zinc oxide materials which have the composition and microstructure to function as varistors for use in surge arrestors.

Another object of the present invention is to provide improved zinc oxide materials which are insensitive to pressure and calcining temperature.

Another object of the present invention is to provide zinc oxide materials which have good die-filling characteristics and which are dust free.

Another object of the present invention is to provide an improvement in the water extraction sol-gel process wherein the high solids content of the feedstock minimizes the amount of water removal from the microspheres.

Another object of the present invention is to provide a varistor comprising pressed doped zinc oxide microspheres.

Another object of the present invention is to provide doped zinc oxide microsphere article.

Another object of the present invention is to provide articles of sintered zinc oxide microspheres.

A further object of the present invention is to provide articles of zinc oxide microspheres which are first sintered and then pressed.

The foregoing is achieved by a process which involves the use of a dispersant or dispersing agent which aids in increasing the solids content in the microspheres. Moreover, the inventive process further utilizes a special drying procedure that produces a colloidal zinc oxide having the required properties to form gel microspheres. The above-described process which yields the gel microspheres provides improved results when utilized in electrical surge arrestors and application of this new methodology is now available for even greater experimentation.

The inventive process involves preparing gel microspheres by preparing an aqueous solution of each dopant, forming dopant sols of hydrous oxides by precipitation from the aqueous solutions, mixing all the dopant oxide sols in the correct proportions, adding a hydrous zinc oxide precipitate which has been washed to the point of peptization and dried at a temperature of from about 100° C. to about 135° C. to form the desired zinc oxide blend, mixing droplets of the zinc oxide blend with alcohol and recovering therefrom the desired doped zinc oxide gel microspheres.

The dopants used are silver, aluminum, boron, bismuth, cobalt, chromium, manganese, nickel, antimony and silicon. These are used in the form of their respective oxides, nitrates and hydroxides. The dopants may be added in any order. We use at least two dopants and prefer at least three dopants adding them in three steps.

The dopants are provided in such an amount as to provide a composition containing from about 60 to about 95% by weight of zinc oxide and have about 5 to about 40% by weight of the metal dopants based on the weight of the zinc oxide and dopant oxides or salts. The preferred percentage for our varistor composition is 80 to 95% by weight of zinc oxide and 5 to 20% by weight dopants.

The preferred size of our doped zinc oxide gel microspheres to be used for varistors is from about 10 to about 500 μm.

The silver dopant is usually supplied in the form of a silver salt. The preferred salt is silver nitrate.

The boron dopant is usually in the form of an acid. The preferred acid is boric acid.

The dopants are added in three steps with the first dopants being a mixture of the silver nitrate and boric acid.

The second dopants are preferably sols of hydrous oxides of aluminum, bismuth, cobalt, chromium, manganese, nickel and antimony. These can be prepared by: (1) precipitating salt solutions preferably nitrate solutions with a base, i.e., ammonium hydroxide; (2) washing same with water to the point of peptization; and (3) suspending in water.

The third dopant is preferably a sol of colloidal silicon oxide.

The hydrous zinc oxide is precipitated from a solution of zinc salt, such as zinc chloride or zinc nitrate, and a base, such as ammonium hydroxide. The precipitate is filtered and washed by reslurrying with water to the point of peptization and the washed solid is dried at a temperature between 100° C.–135° C. to provide the desired hydrous zinc oxide.

The dopants and the hydrous zinc oxide are blended thoroughly and then added to a vessel containing an alcohol such as 2-ethylhexanol and the dispersant Span 80 forming doped zinc oxide gel spheres. The zinc oxide gel spheres are separated by decanting the liquid. The remaining doped zinc oxide gel spheres are washed with isopropanol and then air dried. The resulting doped zinc oxide gel spheres are spherical or near-spherical, have smooth surfaces, and are strong enough to be handled without breakage or the formation of dust.

A dispersant such as Separan may be added prior to adding the hydrous zinc oxide. Separan is made by the Stockhausen Corporation and consists of partially hydrolyzed polyacrylamide with 3 to 7% of the amide groups hydrolyzed to the carboxylic acid sodium salt.

The second dopant sols are preferably a mixture of two or more of the metals selected from aluminum, bismuth, antimony, cobalt, chromium, manganese, nickel and silicon.

The relative amount of metals in our hydrous zinc oxide gel microspheres based upon their oxide or salt is indicated in the following Table 1:

TABLE 1

| Metal | Broad Range % by weight | Preferred Range for varistors % by weight | Example 2 % by weight |
|---|---|---|---|
| Ag | 0–0.1 | .001–.02 | 0.01 |
| Al | 0–0.1 | .002–.01 | 0.003 |
| B | 0–0.1 | .001–.03 | 0.016 |
| Bi | 0–20 | 1–6 | 5.4 |
| Co | 0–5 | .5–2 | 1.0 |
| Cr | 0–5 | .5–2 | 0.9 |
| Mn | 0–5 | .5–2 | 0.5 |
| Ni | 0–5 | .5–2 | 0.9 |
| Sb | 0–5 | .5–4 | 3.4 |
| Si | 0–1 | .2–1 | 0.4 |
| Zn | 50–98 | 80–95 | 87.5 |

The effect of temperature in preparing the hydrous zinc oxide is critical in regard to the production of the gel microspheres. Poor gel spheres or no gel spheres are formed by drying the zinc hydroxide and/or 3-hydrous zinc oxide precipitate at temperatures lower than 100° C. or higher than 135° C. For example, as we illustrate below in our Example 1, a zinc hydroxide precipitate which is wet erodes and has a poor particle appearance. A precipitate which is dried at 24° C. falls apart. Likewise, a precipitate which is dried at 200° C. or 800° C. does not gel. However, the precipitates which are dried at 103° C. and 135° C. have good particle appearance.

Span 80 should account for 0.1% to 0.5% of the volume of the 2-ethylhexanol forming solution. The amount of 2-ethyl-1-hexanol which should be used in the preparation of the gel microspheres is approximately 0.15 to 0.5 liters/g of feed solution. Other alcohols such as 2-methylpentanol have been used for gel sphere preparation by water extraction. The amount of Separan used is from about 0.001 to about 0.01 g/g added metal.

The doped zinc oxide microspheres which result from our aforementioned modified sol-gel method are much more sinterable than the prior art sol-gel powder. The inventive microspheres are also easier to use and are better suited for filling the dies prior to the pressing and sintering process. Moreover, the inventive microspheres have uniform density and microstructure.

DETAILED DESCRIPTION OF THE INVENTION

The present invention contemplates preparing doped zinc oxide microspheres in gel form by a modified sol-gel method. Generally, the inventive zinc oxide microspheres are formed by preparing a high solids content feed suspension which includes a mixture of various dopant sols of hydrous oxides, a zinc hydroxide precipitate and a dispersant. The zinc hydroxide precipitate is initially exposed to a novel drying process which allows ultimately for good gel sphere formation. The above mentioned feed solution is then added to 2-ethyl-1-hexanol wherein gel microspheres are eventually produced. This above-described gel microsphere is used in electrical surge arrestors and will be described in greater detail hereinafter.

The following example illustrates the inventive product and process for making same.

EXAMPLE 1

Zinc hydroxide is initially precipitated from a solution of zinc nitrate ($Zn(NO_3)_2$) with ammonium hydroxide at a pH of 7.5. This involves dissolving 26.2 g $Zn(NO_3)_2 \cdot 4H_2O$ in approximately 80 ml of water and then filtering same through a 0.2 $\mu$m membrane. Subsequent to the above filtering step, the solution is diluted to 100 ml with water. The zinc hydroxide precipitate is then precipitated by adjusting the pH of the solution to 7.5 with 2 mol/L of ammonium hydroxide. The solids are then filtered and washed two times by reslurrying with 200 ml of water to the point of peptization. The washed solid is then dried at 110° C. to provide the desired hydrous zinc oxide.

EXAMPLE 2

A feed suspension was prepared containing about 70 grams of solids.

Approximately 0.0094 g of silver nitrate and 0.0171 g of boric acid were dissolved in 122.12 g of water.

A dopant sol of hydrous oxides of aluminum, bismuth, cobalt, chromium, manganese, nickel and antimony was added to the silver nitrate solution. The dopant sol contained, as hydrous oxide, 0.0353 g aluminum, 13.81 g bismuth, 18.61 g cobalt, 11.76 g chromium, 4.32 g manganese, 25.81 g nickel, and 40.33 g antimony.

Colloidal silicon oxide containing 0.2340 g of silicon oxide was suspended in the above mixture.

96.64 g of a water solution containing about 0.001 g of Separan/g was added to the above mixture.

62.30 g of the hydrous zinc oxide prepared according to Example 1 was then added to feedstock mixture.

This mixture was then blended thoroughly on a vibrating mechanism, such as a paint shaker, for about 30 minutes.

Three batches of gel particles were prepared by pumping the feed solution at a rate of about 10 ml/minute into a stirred vessel containing 10 liters of 2-ethyl-1-hexanol-0.2 vol % Span 80 at 45° C.

After about a thirty minute digestion at 45° C., the above liquid is decanted and the particles are washed with 50 vol % isopropanol and dried in the air. The resulting doped zinc oxide gel microspheres are spherical or near-spherical, rigid and have smooth surfaces. The particles are approximately 10 to 500 $\mu$m in size.

EXAMPLE 3

The increased sinterability and ease of handling of the doped zinc oxide microspheres which resulted from the preparation of same by the aforementioned modified sol-gel method of Example 2 was demonstrated by calcining, pressing and sintering at the process conditions shown in Table 2 below. The asterisks that follow samples S-1, S-2 and S-3 in Table 2 represent powder made by conventional sol-gel processing as compared to the remaining samples which are gel-sphere products.

TABLE 2

| | Sintering of ZnO Gel-Sphere Pellets | | | | | |
|---|---|---|---|---|---|---|
| | Calcined | Pressed | Green | Sintered | | Sintererd |
| Sample | °C. | psi | g/cm³ | °C. | h | g/cm³ |
| V22C-1 | 250 | 10000 | 2.7 | | | |
| -2 | 250 | 15000 | 2.8 | | | |
| -3 | 250 | 20000 | 2.9 | | | |
| V25-7-1 | 400 | 10000 | 2.73 | 1000 | 2 | 5.26 |
| -2 | 400 | 15000 | 2.84 | 1000 | 2 | 5.17 |
| -3 | 400 | 20000 | 2.93 | 1000 | 2 | 5.24 |
| -7 | 400 | 10000 | 2.74 | 1000 | 4 | 5.39 |
| -8 | 400 | 15000 | 2.86 | 1000 | 4 | 5.42 |
| -9 | 400 | 20000 | 2.99 | 1000 | 4 | 5.42 |
| V25-6-1 | 500 | 10000 | 2.77 | 1000 | 2 | 5.25 |
| -2 | 500 | 15000 | 2.91 | 1000 | 2 | 5.51 |
| -3 | 500 | 20000 | 2.99 | 1000 | 2 | 5.48 |
| V25-6-7 | 600 | 10000 | 2.88 | 1000 | 2 | 5.17 |
| -8 | 600 | 15000 | 2.99 | 1000 | 2 | 5.35 |
| -9 | 600 | 20000 | 3.05 | 1000 | 2 | 5.43 |
| S-1* | 250 | 10000 | 2.63 | 1000 | 2 | 4.67 |
| S-2* | 250 | 15000 | 2.77 | 1000 | 2 | 4.47 |
| S-3* | 250 | 20000 | 2.90 | 1000 | 2 | 4.42 |

BRIEF DESCRIPTION OF THE DRAWINGS

Densities in both green and fired states are given in the above table and shown graphically in FIG. 1. Also, the dashed line in FIG. 1 shows the behavior of conventional sol-gel powder that is pressed and sintered under the same conditions. DC electrical properties (FIGS. 2-4) were measured to determine the sensitivity to changes in process variables.

Referring to Table 2 and the plots of density in FIG. 1, it is evident that the gel-sphere material is much more sinterable than the prior art sol-gel powder. Based on relative densification, the preferred calcining temperature is 500° C. to 600° C.

Figure 1:
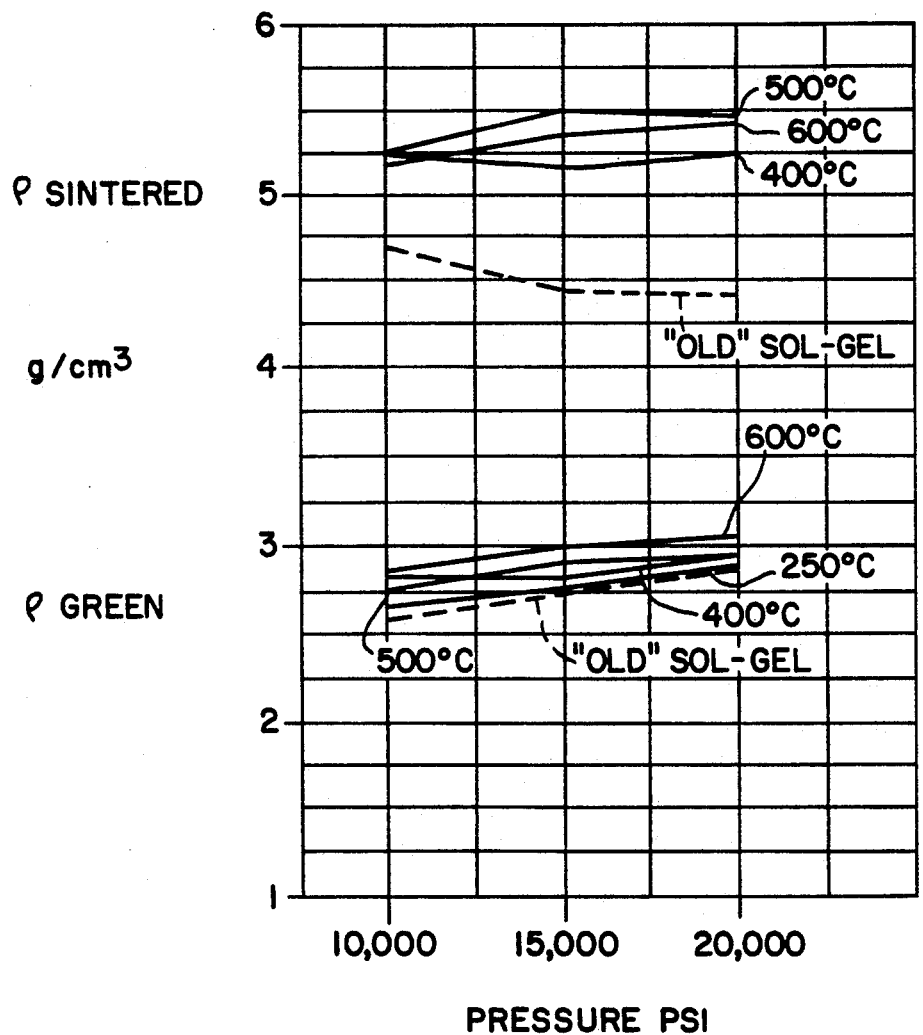
Figure 2:
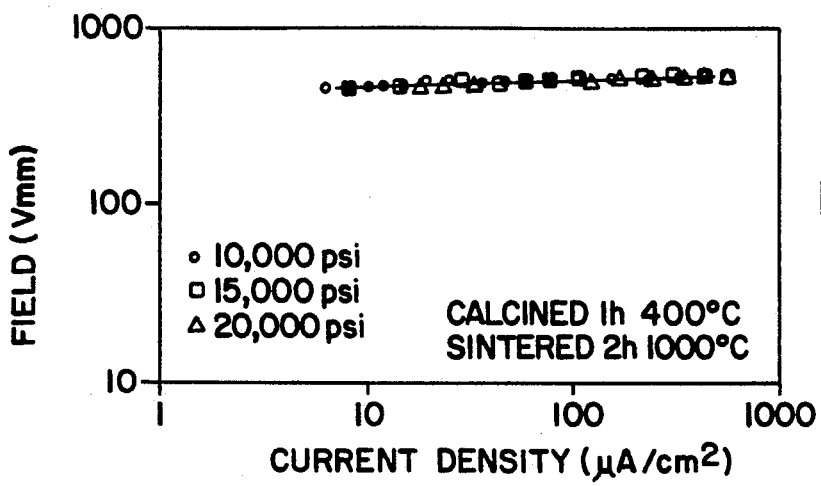
Referring to FIGS. 2–4, a varistor disc was produced according to the aforementioned sol-gel method and was subjected to various pressures to determine whether or not the electrical properties of the disc were sensitive to pressing conditions. The DC electrical measurements show that properties are consistent and insensitive to either pressure or calcining temperature. In each of FIGS. 2–4, all three pellets (10000, 15000 and 20000 psi pressings) are shown on the same V-I curve for any given calcining temperature. The non-linearity coefficients ($\alpha$) are approximately 30 for each case.
Figure 3:
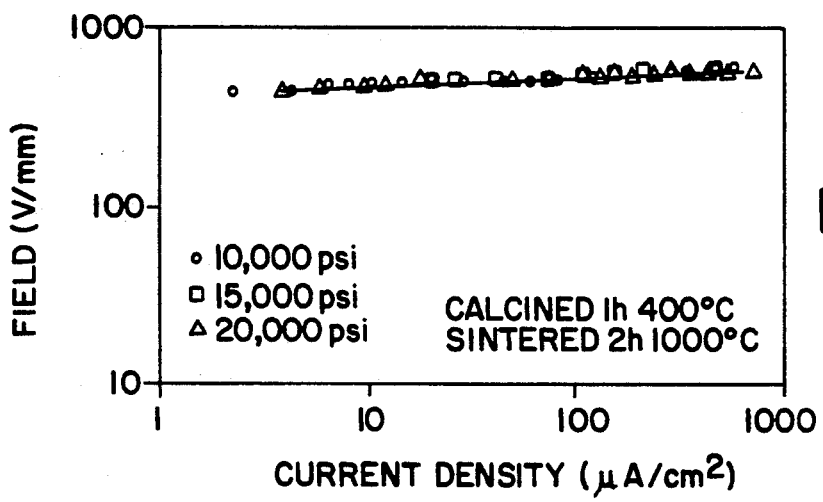
Figure 4:
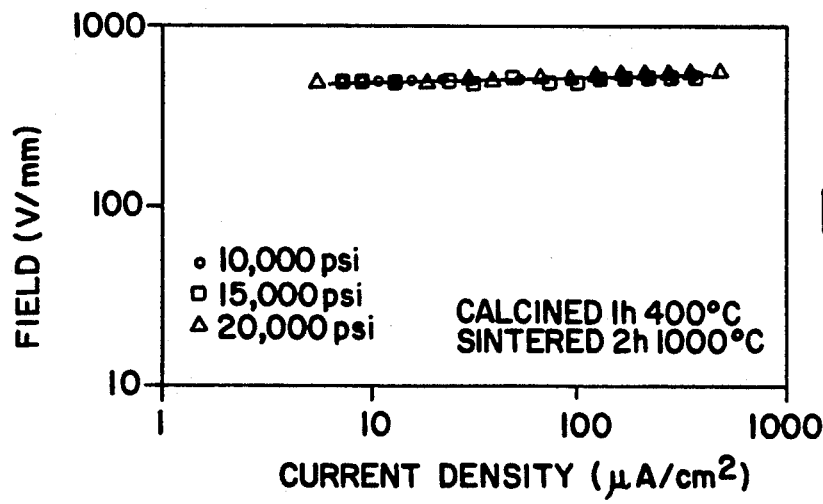

Moreover, the ranges for the pressure, calcining and sintering of the spheres shown in FIGS. 2–4 are not necessarily representative of the lower and upper limits of each range. The doped zinc oxide microspheres may be pressed into pellets at 5000–25,000 psi, calcined at 300°–600° C. and sintered to full density at 1000°–1400°. Deviations made outside of the aforementioned ranges may create problems such as pellet cracking or explosion from trapped air.

Thus, it is apparent that doped zinc oxide microspheres made by the aforementioned modified sol-gel method of Example 2 are highly sinterable when pressed into pellets at 5,000 to 25,000 psi and sintered to full density at about 1000°–1400° C. However, if these gel spheres are sintered totally unconstrained as loose spheres, it is shown that the spheres sinter to full density and develop to a microstructure that is virtually identical to that which forms in pressed pellets. Moreover, the spheres do not adhere to one another despite the fact that some liquid phase is present at the sintering temperature of 1050° C.

EXAMPLE 4

The above-mentioned microstructure of a group of varistor granules was studied after sintering loose gel spheres for three hours in air at 1050° C. The spheres were not pressed into pellets. The resulting ceramic spheres were photomicrographed to reveal the structure formed by the above process. The sintered spheres were dispersed in clear epoxy and polished to cross-section, followed by etching to delineate grain boundaries. The spheres formed individual granules that were still quite spherical despite the high shrinkage and microstructural rearrangement that occurred during sintering. The granules were dense and showed no visible cracks or other macroscopic flaws. Furthermore, each granule had the same microstructure and distribution of phases, indicating that the dopant oxides which are critical to varistor performance are homogeneously distributed throughout the batch. Moreover, the photomicrograph revealed that there is a broad size distribution; however, if needed for a particular application, the sphere diameters can be closely controlled during the gelation process.

Thus, the advantages obtained from sintering gel spheres for three hours at 1050° C. are: one, extremely tight control of chemical and microstructural homogeneity; two elimination of waste from pulverizing or grinding zinc oxide pieces to make granules; three, control of diameter and excellent sphericity; and four, elimination of mechanical damage to the individual granules.

Moreover, these microspheres not only can be used as varistors but have possible alternative uses as fillers in various composites such as electrical rubber goods.

The dense microspheres as produced by Example 4 were then pressed between two electrodes to form a varistor. The varistor had properties that were consistent with those desired for varistors. This is also true of a varistor produced from the microspheres of Example 3. The microspheres are first pressed into the desired shape and thus sintered.

It will now be appreciated that the present invention, provides for a novel doped zinc oxide microsphere that is in the form of a gel and further provides for a novel water extraction process for preparation of same.

The foregoing is for purpose of illustration, rather than limitation of the scope of protection accorded this invention. The latter is to be measured by the following claims, which should be interpreted as broadly as the invention permits.

The invention claimed is:

1. A doped hydrous zinc oxide gel microsphere having hydrous zinc oxide doped with at least two metals selected from the group consisting of silver, aluminum, bismuth, cobalt, chromium, manganese, nickel, antimony, and silicon, said gel microsphere containing above 60% by weight zinc oxide based upon the weight of the zinc oxide and dopants, said gel microsphere having a diameter from about 10 to about 500 $\mu$m, and wherein said gel microspheres may be calcined without disintegrating into a powder.

2. The doped zinc oxide gel microsphere of claim 1 wherein the hydrous zinc oxide used to prepare said gel microsphere was prepared by forming a hydrous zinc oxide or a zinc hydroxide precipitate and drying said precipitate at a temperature of between 100° C. and 135° C.

3. The doped zinc oxide gel microsphere of claim 1 wherein said dopant is a mixture of the metals aluminum, bismuth, cobalt, chromium, manganese, nickel, antimony, silver and silicon.

4. The doped zinc oxide gel microsphere of claim 1 wherein said gel spheres are sintered for three hours in air at a temperature of about 1000° C. to 1400° C.

5. The sintered microspheres of claim 4 wherein the doped zinc oxide microspheres were sintered at a temperature of 1050° C.

6. The zinc oxide gel microsphere of claim 2 comprising from about 60 to about 95% by weight of zinc oxide and about 5 to 40% by weight of dopants based on the weight of the zinc oxide and dopants, said dopants being a plurality of dopants selected from the group consisting of silver salts, boron oxide, silicon oxide, hydrous oxides of aluminum, bismuth, cobalt, chromium, manganese, nickel and antimony.

7. The zinc oxide gel microsphere of claim 6 comprising 0.001 to 0.02% by weight of silver salt, 0.001 to 0.01% by weight of aluminum oxide, 0.001 to 0.3% by weight of boron oxide, 1 to 6% by weight of bismuth oxide, 0.5 to 2% by weight of cobalt oxide, 0.5 to 2% by weight of chromium oxide, 0.5 to 2% by weight of manganese oxide, 0.5 to 2% by weight of nickel oxide, 0.5 to 4% by weight of antimony oxide, 0.2 to 1% by weight of silicon oxide.

8. The zinc oxide gel microsphere of claim 6 wherein the zinc oxide is doped with at least three dopants.

9. Doped zinc oxide gel microspheres according to claim 1 wherein said microspheres contain at least three dopants and having from about 60 to about 95% by weight of zinc oxide and from about 5% to about 40% by weight of dopants based on the weight of said zinc oxide and dopants.

10. Doped zinc oxide gel microspheres according to claim 2 wherein said microspheres contain at least three dopants and having from about 60 to about 95% by weight of zinc oxide and from about 5% to about 40% by weight of dopants based on the weight of said zinc oxide and dopants.

* * * * *